United States Patent [19]

Mayerle

[11] 4,338,196

[45] Jul. 6, 1982

[54] BIOLOGICAL TREATMENT OF A FORMALDEHYDE-CONTAINING WASTE WATER CONTACTED WITH A BIOMASS TOGETHER WITH A NITROGEN COMPOUND

[75] Inventor: Leanne Mayerle, Corpus Christi, Tex.

[73] Assignee: Celanese Corporation, New York, N.Y.

[21] Appl. No.: 54,767

[22] Filed: Jul. 5, 1979

[51] Int. Cl.$^3$ ............................ C02F 3/28; C02F 3/30
[52] U.S. Cl. .................................. 210/610; 210/617; 210/622; 210/908
[58] Field of Search .................. 210/2, 11, 18, 12, 16; 435/247, 262

[56] References Cited

U.S. PATENT DOCUMENTS

| | | | |
|---|---|---|---|
| 3,642,578 | 2/1972 | Hitzman et al. | 435/247 |
| 3,660,278 | 5/1972 | Mimura et al. | 210/11 |
| 3,909,408 | 9/1975 | Ishida et al. | 210/11 |
| 3,923,648 | 12/1975 | Lashley, Jr. | 210/12 |

FOREIGN PATENT DOCUMENTS

| | | | |
|---|---|---|---|
| 45-28235 | 9/1970 | Japan | 210/2 |
| 1462736 | 1/1977 | United Kingdom | 210/11 |

*Primary Examiner*—Benoît Castel
*Attorney, Agent, or Firm*—Ralph M. Pritchett

[57] ABSTRACT

In the treatment of a waste water containing formaldehyde by a method which involves introducing the waste water into a biological digestor into which there is also introduced another stream comprising a nitrogen-containing compound, especially ammonia or an ammonium salt, process difficulty caused by the formation of refractory adducts of the formaldehyde with the nitrogen compound (especially hexamethylenetetramine) is minimized by introducing the waste water and the nitrogen compound into the digestor in two separate streams instead of allowing the two streams to mix in the digestor feed line or in a preliminary holding pond. The method is especially applicable in systems in which ammonia or some other source of ammonium ions is introduced into the digestor as a nutrient for the contained biomass.

7 Claims, No Drawings

BIOLOGICAL TREATMENT OF A FORMALDEHYDE-CONTAINING WASTE WATER CONTACTED WITH A BIOMASS TOGETHER WITH A NITROGEN COMPOUND

BACKGROUND OF THE INVENTION

This invention relates to the biological purification of waste waters by methods comprising treatment with either anaerobic or aerobic microorganisms. More particularly it relates to the treatment of waste waters containing formaldehyde, in which processes the formaldehyde-containing waste water is introduced into a suitable biological digestor along with a second, nitrogenous stream which contains any of several types of nitrogen compounds as will be explained more fully hereinbelow. Especially, however, the invention relates to the treatment of a formaldehyde-containing waste water in a system within which a nitrogen compound, as exemplified by ammonia, is introduced into the digestor along with the waste water for the purpose of supplying nitrogen nutrient for the contained biomass.

Biological waste water treatment systems comprise three main types: (a) aerobic systems, (b) anaerobic systems, and (c) combination systems in which a first anaerobic stage is followed by a second aerobic stage. The aerobic systems are inherently, to some degree at least, back-mixed by the turbulence caused by the air which is essential to the process and which is commonly sparged into the bottom of the digestor vessel. The anaerobic systems include both back-mixed digestors and others, especially including certain types of anaerobic filter, which approach once-through operating conditions. An especially useful type of anaerobic filter operates with a recycle of the effluent liquid back to the filter inlet whereby a back-mixed environment obtains in the anaerobic filter digestor. Such a back-mixed recycling anaerobic filter is described in Belgian Pat. No. 828916 by E. R. Witt et al assigned to Celanese Corporation.

Until recently, the waste waters which were treated by biological digestion methods have been from natural, as distinguished from industrial, sources, as exemplified by municipal sewage. It will be understood that much of the published technology in the field has spoken of the wastes from food processing plants and slaughter houses, for example, as being industrial wastes, but it will be seen that these are essentially natural materials even though they may in some cases be of extremely high concentration so as to present some difficulty in processing. Effluents from the synthetic chemical industry, which are not of natural origin, have not been treated by biological methods until quite recently, and even now the biological treatment of such materials is in its infancy. Only recently, for example, has any attention been paid to attempting the biological treatment of such compounds as formaldehyde and phenol, both of which have been thought of as biocidal or biostatic.

While it is now coming to be realized that formaldehyde in particular is in fact amenable to biological digestion, it has not as yet been realized that its processing requires any special considerations other than the (arguably at least) obvious one of avoiding such excessively high concentrations as to overload the biomass. There is also the now generally-understood consideration that formaldehyde and other synthetic chemicals require, as distinguished from substances which are of natural origin, the incorporation of biomass nutrients, especially nitrogen and phosphorus, into the waste water which is to be treated. Natural materials, such as sewage, food-processing wastes, and slaughter house wastes, usually include sufficient biomass nutrient moiety that supplemental nutrients are not essential.

Thus, the biological digestion of waste water containing formaldehyde usually, if not always, calls for incorporating biomass nutrients, including specifically a nitrogen source, into the waste water which is to be treated. Such nitrogenous nutrients can comprise ammonia (which is especially advantageous because of its low cost and ease of distribution) or, alternatively, its obvious equivalents, e.g., ammonium hydroxide, ammonium salts, urea, etc. Such supplemental nutrients, when they are employed, have normally, in the prior art, been conveniently incorporated into the waste water before it is introduced into the biological digestor. There are several reasons for this. For example, admixing of the nutrient into the waste water is facilitated when this is done as far as possible upstream from the digestor inlet. That is, in passing through pumps, bends in the piping, etc. together, the waste water and the nutrients are thoroughly mixed without the need for special mixing equipment. Also, biological digestion systems frequently include a holding pond or equivalent surge tank ahead of the biological digestor itself for the purpose of smoothing out undesirable surges in organic loading of the digestion system. Such holding ponds or tanks can be made to serve a gauging function, and here again there are practical advantages in adding a measured quantity of nutrient into a measured quantity of waste water as it is admitted into these holding vessels. In summary, practical considerations lead one of normal skill in the art to mix the nutrient, including specifically the nitrogenous portion of the nutrient, into the waste water well ahead of the point at which it enters the biological digestor. These same considerations apply whether the digestion system is aerobic, anaerobic, or a combination of the two.

It has recently been observed, however, that in treating waste waters containing formaldehyde there have been times when the chemical oxygen demand of the digestor outfall liquid began to increase to an undesirably or unacceptably high level even though the biomass remained in good condition, when there had been no surge in organic concentration in the waste water being fed, and when there had been no known admixture of unacceptable levels of heavy metals or other substances adverse to biomass activity into the system. The present invention is directed to means which have been discovered for coping with this condition.

It is, accordingly, an object of the present invention to provide an improved method for carrying out the biological digestion of waste waters containing formaldehyde. It is a further object to provide a method for alleviating the undesirable conditions sometimes obtaining when the oxygen demand of the digestor outfall increases in digestors processing formaldehyde-containing waste waters. It is a particular object to improve the treatment efficiency in biological digestion systems into which there are introduced both a formaldehyde-containing waste water and also a stream comprising a nitrogenous compound as will be more particularly explained hereinbelow. Other objects will be apparent from the following detailed description and examples.

SUMMARY OF THE INVENTION

In accordance with the present invention, it has now been discovered that the previously-unexplained decreases in the efficacy of biological digestion systems treating a waste water containing formaldehyde are sometimes caused by the very rapid reaction of the formaldehyde with ammonia, ammonium salts, amides such as urea, or primary or secondary amines to form products which, although not necessarily biocidal or biostatic toward the biomass in the digestor, are unexpectedly resistant to biological digestion. This is especially the case when the nitrogenous compound is ammonia or an equivalent source of ammonium moiety, which reacts immediately with any formaldehyde present to form hexamethylenetetramine, especially under alkaline conditions. This undesired reaction takes place especially in systems in which ammonia or other equivalent source of ammonium ions is being employed as a source of nitrogen nutrient for the biomass organisms. Analogous condensation reactions between the formaldehyde and other nitrogenous materials including primary and secondary amines and also amides, as exemplified by urea, can also take place with results which vary in severity according to the biological resistance of the particular formaldehyde condensation product which is formed. Some of these condensation products are less refractory than others toward biological digestion, with their resistance to the digestion being due in some cases to stability of the molecule as in the case of hexamethylenetetramine and, in other cases, to the formation of insoluble polymers which resist digestion because of their solid state. A specific example of this latter category has been observed in treating waste waters containing a mixture of formaldehyde and primary diamines, as exemplified by hexamethylenediamine, the solid polymeric reaction product so obtained being resistant to the action of the biomass.

In accordance with the present invention, the above-described difficulties with waste waters containing both formaldehyde and a nitrogenous material such as ammonia are obviated by preventing the admixture of the stream of nitrogenous material into the formaldehyde-containing waste water until the formaldehyde-containing waste water has been admixed into the liquid contained in the digestor, whereby the formaldehyde concentration will be at essentially the concentration existing in the digestor outfall. By this method competition between the formaldehyde and the biomass organisms for the nitrogen is reduced, the microorganisms being enabled to absorb, and make use of, the greater portion of the nitrogen before it has been abstracted from the system by reaction with the formaldehyde. Basically, the present process improvement can be summarized as introducing the formaldehyde-containing waste water and the nitrogenous stream individually into the digestor at two or more separate injection points, with the nitrogenous stream being injected at a point where the liquid contents of the digestor are at or near outfall concentration conditions.

DETAILED DESCRIPTION OF THE INVENTION

The details of anaerobic, aerobic, and combination anaerobic-aerobic digestion systems as already known to the art are outside the scope of the present invention, the application of which involves only the method of introducing into that system whatever nitrogenous materials, as exemplified by ammonia, are to be added to the digestor, whether the nitrogenous material be a biomass nutrient as in the case of ammonia or a waste water component itself as in the case of amine or amide-containing residues formed in industrial chemical processes. In terms of the apparatus normally employed industrially for biological digestion, however, the application of the invention can be explained more specifically as follows:

Insofar as the formaldehyde waste water itself is concerned, there will be no change from the manner in which it would be handled in accordance with the prior art. For example, excessively high chemical oxygen demand in the material fed into the digestor is already known in the prior art as an adverse factor, and dilution as necessary to avoid shocking the biomass would be continued with or without the incorporation of the present improvement into the process. Likewise, it is common practice to blend several waste water streams, when a given industrial installation produces more than one waste water requiring treatment, to maintain a relatively constant digestor inlet composition, and this practice would be continued when employing the present invention. Such blending frequently entails the use of a holding pond upstream of the digestor itself for the purpose of eliminating surges both in substrate concentration and also in volumetric feed rate into the digestor. Application of the present invention to such process apparatus lies essentially in simply keeping the nitrogenous stream out of the formaldehyde-containing waste water stream while it is being held in, or passing through, any of this preliminary holding and/or blending apparatus and, instead, introducing the nitrogenous stream directly into the biological digestor itself.

When the nitrogenous stream is a relatively small one which is being added to the digestor for the purpose of providing nutrients to the microorganisms contained therein, it will be introduced at a relatively low rate controlled, by any of many methods known to the prior art, so as to enter the digestor in a set proportion to the chemical oxygen demand of the waste water which is also entering the digestor. For example, there are rules of thumb known in the art for controlling this proportion including, for example, the widely-recognized principle that the ratio of chemical oxygen demand:nitrogen:phosphorus should be approximately 100:5:1. Details regarding such principles are outside the scope of the present invention.

However, when the nitrogenous stream is itself a waste water of appreciable volume compared to the formaldehyde-containing waste water, it may be found expedient to employ a separate system of holding vessels, blending apparatus, etc. to control the flow and concentration of the nitrogenous stream in the same manner as is sometimes required for the formaldehyde-containing waste water itself. This again, however, is outside the scope of the present invention, which lies solely in the manner of injection of the nitrogenous stream into the digestor and not in the rate at which it is introduced nor the method or methods employed to avoid surges in volumetric loading or organic substrate loading, all of which are already understood in the art.

The present method is best applied in those digestion systems wherein there is substantial back-mixing, whereby the contained liquid is all at the same, or approximately the same, concentration of organics in the effluent or outfall liquid as measured by chemical oxygen demand. For example, an aerobic digestor will have internal back-mixing because of the agitating effect of the air which is sparged into it. In addition, aerobic digestors are also frequently provided with means for strong mechanical agitation. Anaerobic digestors, when they are of the tank type, are internally agitated to a significant degree by the evolved digestion gases and also may be provided with mechanical agitation to suspend the biomass, so that here again the liquid contents of the digestor are all at approximately the same concentration of organic loading.

Anaerobic filters are sometimes not very well back-mixed because the internal packing restricts such internal back-mixing unless a recycle is provided. Recycling anaerobic filters of the type described in Belgian 828,916 do have a high degree of back-mixing because the filter effluent is recycled to the inlet in substantial proportions relative to the rate at which fresh waste water is introduced, e.g., frequently 10 parts or more of recycled outfall liquid per part of freshly-introduced waste water. Such anaerobic filters are especially adapted to use with the present process improvement.

In a digestion system which is not back-mixed, e.g., in a nonrecycling anaerobic filter or in a lagoon within which the flow is unidirectional, some, at least, of the benefits of the present method can be realized by introducing the nitrogenous stream through a plurality of injection points positioned along the flow of waste water through the digestor, whereby there will be at least some improved opportunity for the contained microorganisms to absorb the nitrogenous material before it has completely reacted with the formaldehyde which is present. Back-mixed systems are preferred, however.

When applying the present method to an aerobic digestor it is recommended that the nitrogenous stream be introduced into the contained liquid in such a manner that it is well distributed throughout the digestor as rapidly as reasonably possible. For example, if mechanical agitators are employed, it can be injected in the immediate vicinity of at least one of the agitators. Alternatively, it can be introduced near the air sparger. If the digestor is of substantial diameter, e.g., 50 ft or more in diameter, it is helpful to introduce about 25% of the nitrogenous stream into each quadrant of the digestor, especially if each quadrant has a separate agitator and/or air sparger, as is often the case. Introduction at only one point is feasible, but using a plurality of points is preferred.

When employing the method with an anaerobic tank-type digestor of the type which does not comprise a recycle, it is advantageous to introduce the nitrogenous stream either into the central part of the vessel or else through a plurality of injection points spaced throughout its interior and preferably extending inwardly some distance from the walls so as to facilitate mixing into the contents of the vessel.

In the case of a recycling anaerobic filter it is convenient to introduce the nitrogenous stream into the recycle line wherein, it will be understood, it is being admixed into a liquid which corresponds essentially to the composition of the filter effluent and which is therefore low in formaldehyde content as compared with the original waste water which is being treated. Alternatively, of course, one can introduce the nitrogenous stream into the filter itself, but from considerations of piping design, liquid mixing, etc. it is preferred to inject into the recycle system.

While many variations will be seen to be possible, the following Examples are given to illustrate further the practice of the invention.

EXAMPLE 1

A waste water stream consisting essentially of aqueous effluent from an organic chemicals manufacturing plant and having a total chemical oxygen demand of 7200 milligrams oxygen per liter and containing approximately 0.3% by weight of dissolved formaldehyde was introduced continuously into a square, flat-bottomed aerobic digestor approximately 11.5 feet deep with sides about 128 feet long at the top and 83 feet long at the bottom. The digestor was both aerated and agitated by four high-speed surface aerators of conventional design, one such agitator being positioned in each quadrant of the digestor vessel. Liquid retention time in the digestor was approximately 4.6 days. Before entering the aerobic digestor, the waste water was passed through straining, holding, blending, and oil-skimming facilities, so that it was free of oil and suspended solids, and also not subject to gross surges in organic concentration.

In order to provide nutrient for the biomass contained in the digestor, a flow of ammonia was continuously added into the pipe through which the waste water was being introduced into the digestor. That is, the ammonia was admixed into the waste water before it had been contacted with the biomass contained in the digestor and before it had been admixed into the liquid contents of the digestor. The waste water on its way to the digestor was in admixture with the ammonia for about 3.6 minutes before it entered the digestor.

Operating in the manner just described, the digestor had been producing an effluent having a chemical oxygen demand of up to about 300 mg of oxygen per liter, but there were sporadic increases up to more than 450 mg of oxygen per liter, and on occasion up to about 800 mg per liter with no known change in composition of the waste water being fed. Study of the effluent liquid during this period of high chemical oxygen demand revealed that hexamethylenetetramine, not present in the waste water being fed and not previously known to be a component of the effluent, was present in the effluent in a concentration of about 325 ppm. During this period it was determined that the biomass in the digestor was in satisfactory condition, but it was evident that it was not attacking the hexamethylenetetramine.

The rate of addition of the ammonia to the waste water was and continued to be, approximately 2.4 parts of ammonia by weight per 100 parts of chemical oxygen demand in the waste water being fed. Along with the ammonia, 0.76 part by weight of phosphoric acid was also added per 100 parts of chemical oxygen demand in the waste water.

After the hexamethylenetetramine was detected in the effluent as explained above, the mode of ammonia addition was then changed. Instead of introducing it into the waste water being pumped into the digestor, the ammonia, in a total amount which was substantially the same as before the change, was divided into four equal portions, each of said portions being injected into the bottom of the digestor in the immediate vicinity of one of the four aerator-agitators. Within less than 24 hours, a decrease in the chemical oxygen demand of the digestor was noticed, and the hexamethylenetetramine content of the effluent also began a steady decline. After approximately 15 days of operation in this manner, the chemical oxygen demand of the digestor effluent was approximately 185 milligrams oxygen per liter and the hexamethylenetetramine content was approximately 6 ppm. The hexamethylenetetramine concentration subsequently remained below about 10 ppm over extended periods of operation, e.g. for periods of months.

EXAMPLE 2

On a small experimental scale tests were made of the behavior of a waste water containing formaldehyde and of approximately the same composition as described in Example 1 when it was admixed with another waste water containing approximately 0.3% hexamethylenediamine. When the blend was such that the hexamethylenediamine content of the blend was about 150 ppm or greater, the formation of a turbid precipitate was noticed, especially whenever the formaldehyde content was relatively high, e.g., above about 5 to 8 grams per liter. The solid precipitate is resistant to biological degradation. Such portion of the hexamethylenediamine-formaldehyde condensation product as remains in solution degrades slowly, especially under anaerobic conditions. Under aerobic conditions the degradation of the dissolved material, as measured by hexamethylene-diamine content of the digestor effluent, was comparatively high. The conclusion was that hexamethylenetetramine formed when adding ammonia, as in Example 1, was especially refractory biological digestion whereas the condensation products of formaldehyde with organic amines, as formed from hexamethylenediamine, are not so refractory if in solution but sill present a problem because of the formation of solid precipitates.

The embodiments of the invention in which an exclusive property or privilege is claimed are defined as follows:

1. In a process which comprises introducing into a biological digestor (a) a nitrogen compound which is a member of the group consisting of ammonia, ammonium salts, amides, and primary and secondary amines along with (b) a waste water stream containing formaldehyde for the purpose of biologically decomposing said formaldehyde by the action of microorganisms contained in said digestor, the improvement which comprises:
   introducing said nitrogen compound into said digestor in a nitrogenous stream which is separate from said formaldehyde-containing waste water stream, whereby mixing of the nitrogen compound with the formaldehyde-containing waste water is prevented until both the nitrogenous stream and the formaldehyde-containing waste water stream have become admixed into the liquid contents of the biological digestor.

2. The improvement of claim 1 wherein the biological digestor is back-mixed by internal agitation or by recycling digestor outfall liquid to the digestor inlet.

3. The improvement of claim 2 wherein the nitrogen compound is a member of the group consisting of ammonia, and ammonium salts, and urea.

4. The improvement of claim 3 wherein the nitrogen compound is a member of the group consisting of ammonia and ammonium salts.

5. The improvement of claim 4 wherein the digestor is an aerobic digestor.

6. The improvement of claim 4 wherein the digestor is an anaerobic digestor.

7. The improvement of claim 6 wherein the digestor is an anaerobic filter.

* * * * *